(12) United States Patent
Nagarajan

(10) Patent No.: US 7,342,873 B1
(45) Date of Patent: Mar. 11, 2008

(54) EFFICIENT ARCHITECTURES FOR PROTECTION AGAINST NETWORK FAILURES

(75) Inventor: Ramesh Nagarajan, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1695 days.

(21) Appl. No.: 09/587,892

(22) Filed: Jun. 6, 2000

(51) Int. Cl.
H04L 12/26 (2006.01)

(52) U.S. Cl. .................. 370/217; 370/221

(58) Field of Classification Search .......... 370/216, 370/217, 218, 219, 220, 221, 222, 225, 227, 370/228, 235, 236, 401, 403, 404–405, 406, 370/248, 223, 224; 709/239; 714/1–4; 398/59
See application file for complete search history.

(56) References Cited

U.S. PATENT DOCUMENTS

| | | |
|---|---|---|
| 4,956,835 A | 9/1990 | Grover |
| 5,093,824 A | 3/1992 | Coan et al. |
| 5,146,452 A * | 9/1992 | Pekarske ............ 370/228 |
| 5,218,601 A * | 6/1993 | Chujo et al. ......... 370/228 |
| 5,435,003 A | 7/1995 | Chng et al. |
| 5,537,532 A | 7/1996 | Chng et al. |
| 5,581,689 A | 12/1996 | Slominski et al. |
| 5,590,118 A * | 12/1996 | Nederlof ............ 370/218 |
| 5,590,119 A * | 12/1996 | Moran et al. ........ 370/225 |
| 5,719,854 A | 2/1998 | Choudhury et al. |
| 5,742,774 A * | 4/1998 | Al-Salameh et al. ... 709/251 |
| 5,781,535 A * | 7/1998 | Russ et al. .......... 370/248 |
| 5,886,801 A * | 3/1999 | Van Deventer ........ 398/59 |
| 6,021,113 A | 2/2000 | Doshi et al. |
| 6,052,373 A | 4/2000 | Lau |

(Continued)

FOREIGN PATENT DOCUMENTS

EP 0 570 882 A2 11/1993

(Continued)

OTHER PUBLICATIONS

J.J. He et al., "A Novel Routing and Switching Strategy Based on Packet Flows in Optical IP Networks," WDM and Photonic Networks, pp. 70-77, 2000.

(Continued)

*Primary Examiner*—Huy D. Vu
*Assistant Examiner*—Toan Nguyen

(57) ABSTRACT

Traffic demands are routed between network elements so as to provide improved protection against network failures. A given traffic demand is routed from a first network element to a second network element, where the second network element is preferably either one of a set of dual-homed elements, or coupled to a dual-homed element, and may also be an element of a ring-type transport or a mesh-type transport. The second network element processes the traffic demand such that a copy of a signal associated with the demand is (i) retained at the second network element, while the signal is routed to at least one additional network element, or (ii) routed to at least one additional network element, while the signal is routed to at least one network element other than the additional network element. For example, in a multidrop connection implemented in accordance with the invention, a copy of the signal is "dropped" at the second network element and one or more additional network elements. In a multicast connection implemented in accordance with the invention, one or more copies of the signal are multicast from the second network element to multiple additional network elements.

19 Claims, 12 Drawing Sheets

U.S. PATENT DOCUMENTS 6,147,966 A * 11/2000 Johnson et al. ............. 370/221
6,229,787 B1 * 5/2001 Byrne ........................ 370/218
6,654,379 B1 * 11/2003 Grover et al. ............. 370/406

FOREIGN PATENT DOCUMENTS

| EP | 0 994 591 A2 | 4/2000 |
|---|---|---|
| WO | WO 00/69126 | 11/2000 |
| WO | WO 01/15363 A1 | 3/2001 |

OTHER PUBLICATIONS

J. Anderson et al., "Fast Restoration of ATM Networks," IEEE Journal on Selected Areas in Communications, vol. 12, No. 1, pp. 128-138, Jan. 1994.

W.D. Grover, "The SelfHealing™ Network: A Fast Distributed Restoration Technique for Networks Using Digital Cross Connect Machines," IEEE Globecom '87, pp. 1090-1095, 1987.

C.H. Yang et al., "FITNESS: Failure Immunization Technology for Network Service Survivability," IEEE Globecom '88, pp. 1549-1554, 1988.

C.E. Chow et al., "A Fast Distributed Network Restoration Algorithm," IEEE Globecom '93, pp. 261-267, 1993.

S. Hasegawa et al., "Control Algorithms of SONET Integrated Self-Healing Networks," IEEE Journal on Selected Areas in Communications, vol. 12, No. 1, pp. 110-119, Jan. 1994.

W.D. Grover et al., "Near Optimal Spare Capacity Planning in a Mesh Restorable Network," IEEE Globecom '91, pp. 2007-2012, 1991.

H. Komine et al., A Distributed Restoration Algorithm for Multiple-Link and Node Failures of Transport Networks, IEEE Globecom '90, pp. 459-463, 1990.

B.T. Doshi et al., "Dual (SONET) Ring Interworking: High Penalty Cases and How to Avoid Them," Proceedings of ITC 15, pp. 361-370, Jun. 1997.

C. Buyukkoc et al., "Load Balancing on SONET Rings," Proceedings of ICT '96, Istanbul, pp. 763-766, 1996.

S. Cosares et al., "An Optimization Problem Related to Balancing Loads on SONET Rings," Telecommunication Systems, vol. 3, pp. 165-181, 1994.

US 5,699,349, 12/1997, Russ et al. (withdrawn)

\* cited by examiner

US 7,342,873 B1

EFFICIENT ARCHITECTURES FOR PROTECTION AGAINST NETWORK FAILURES

RELATED APPLICATION

The present application is related to U.S. patent application Ser. No. 09/588,490, filed concurrently herewith in the name of inventors B. Doshi and R. Nagarajan and entitled "Methods and Apparatus for Protection Against Network Failures," which is incorporated by reference herein.

FIELD OF THE INVENTION

The present invention relates generally to techniques for protecting an optical network or other type of network from a failure in a link, span, node or other element of the network, and more particularly to techniques which permit traffic to be redirected through the network in the event of such a failure.

BACKGROUND OF THE INVENTION

Communication network technology is advancing at a rapid rate. For example, all-optical networks using wavelength division multiplexing (WDM) are currently being deployed for a wide variety of communication applications. WDM techniques allow optical signals having different wavelengths to be multiplexed into a single optical fiber. Each of the wavelengths serves as an optical carrier and can be used independently of the other wavelengths, such that different wavelengths may use different modulation formats to carry different signal types. In one possible implementation, each wavelength may carry a modulation signal representing a synchronous optical network/synchronous digital hierarchy (SONET/SDH) client payload, where each client is a SONET-rate time division multiplexed (TDM) application and the common carried signals are in an OC-x format, where "OC" denotes optical carrier and x denotes the rate, e.g., an OC-3 format, an OC-48 format, an OC-192 format, etc.

Such optical networks generally include routing elements such as wavelength switching cross-connects, wavelength adapters, wavelength interchanging cross-connects, etc. A wavelength switching cross-connect serves to cross-connect incoming wavelengths on a given input fiber to different output fibers, but does not provide any transformation in wavelength. When only this type of routing device is present in an optical network, the network typically routes a given end-to-end demand using a single wavelength. If a primary network path assigned to the given demand fails, the demand generally must be carried on a secondary or restoration path using exactly the same wavelength as the primary path. A wavelength adapter is a device which allows conversion of wavelength at the client-network interface. A wavelength interchanging cross-connect is used to cross-connect incoming wavelengths onto different output fibers while also providing transformation of wavelengths.

One type of approach to providing failure protection in an optical network formed of these and other elements is to provide complete redundancy, such that the network includes a dedicated backup or secondary connection for each primary connection of the network. When a link, span or node of the primary connection fails, traffic may then be switched onto the corresponding elements of the secondary connection.

FIG. 1 illustrates a conventional failure protection approach of this type which is particularly designed to protect against nodal failures. The approach is commonly referred to as "dual homing." The figure shows a portion of a network which includes a source network element NE-A and a destination network element NE-Z. Associated with NE-A is a set 10 of dual-homed network elements 10-1 and 10-2. Associated with NE-Z is a set 12 of dual-homed network elements 12-1 and 12-2. Each of the network elements shown may correspond to a router, a switch or a cross-connect. In the conventional dual-homing approach, a single demand between NE-A and NE-Z is translated into two demands S1 and S2, each requiring the same capacity as the original single demand. The two demands S1 and S2 are routed between NE-A to the set 10 of dual-homed network elements, and similarly from the set 12 of dual-homed network elements to NE-Z. Although this dual-homing approach provides protection against nodal failures, the doubling of demands leads to excess network capacity and hence increased cost.

One particular application of the conventional dual homing approach illustrated in FIG. 1 is in a network which is divided into multiple administrative domains, operational domains or other types of domains. In such an arrangement, traffic is often handed off from one domain to another via a node which operates as a gateway between the two domains. Unfortunately, the above-described conventional dual homing approach is unable to provide adequate and efficient protection in this application as well as other important applications.

What is needed is an improved dual-homing approach which overcomes the above-noted problems associated with the conventional dual-homing approach.

SUMMARY OF THE INVENTION

The present invention provides improved dual-homing techniques for protecting against network failures in an optical network or other type of network.

In accordance with the invention, a given traffic demand is routed from a first network element to a second network element, where the second network element is preferably either one of a set of dual-homed elements, or coupled to a dual-homed element, and may also be an element of a ring-type transport or a mesh-type transport.

The second network element processes the traffic demand such that a copy of a signal associated with the demand is at least one of: (i) retained at the second network element, while the signal is routed to at least one additional network element; and (ii) routed to at least one additional network element, while the signal is routed to at least one network element other than the additional network element. For example, in a multidrop connection implemented in accordance with the invention, a copy of the signal is "dropped" at the second network element and one or more additional network elements. As another example, in a multicast connection implemented in accordance with the invention, one or more copies of the signal are multicast from the second network element to multiple additional network elements.

Advantageously, the present invention provides improved protection against network failures while requiring less additional capacity than the conventional dual-homing approach described previously. In addition, the invention can provide link level protection against fiber cuts or other failures. Furthermore, the invention ensures that a link failure will not force a switch between a primary dual-homed element and a secondary dual-homed element. The invention also provides a reduction in complexity relative to conventional dual-homed architectures.

The techniques of the present invention are well-suited for use in complex fiber-based optical networks which include wavelength select devices, wavelength adapters, wavelength interchange devices and other types of optical routers, but are more generally applicable to any other type of network and any type of transport medium.

These and other features and advantages of the present invention will become more apparent from the accompanying drawings and the following detailed description.

DETAILED DESCRIPTION OF THE INVENTION

The invention will be illustrated herein in conjunction with the routing of exemplary traffic demands between network elements, also referred to herein as network nodes. It should be understood, however, that the invention is not limited to use with any particular type of traffic demand, network element or network, but is instead more generally applicable to any network traffic routing situation in which it is desirable to provide improved protection against network failures. For example, the network failure protection techniques of the invention may be utilized not only in optical networks, but also in telephone, cable and other electrical networks. The term "network" as used herein is therefore intended to include, e.g., optical networks, electrical networks and hybrid optical-electrical networks.

Figure 2:
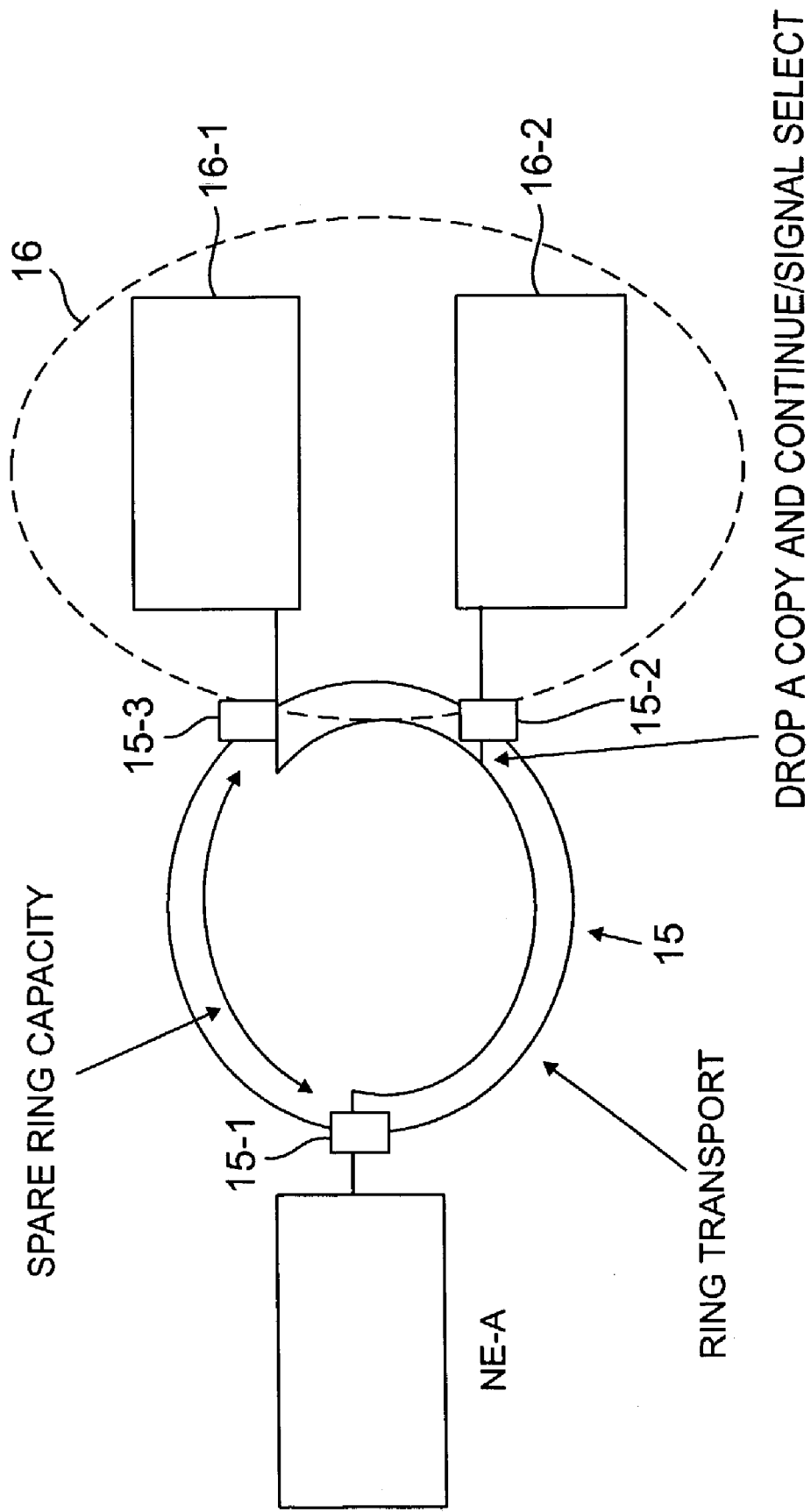
FIG. 2 shows an improved dual-homing approach which utilizes a ring-type transport in accordance with an illustrative embodiment of the invention.

FIG. 2 shows a portion of a network which incorporates an improved dual-homing approach in accordance with an illustrative embodiment of the invention. The portion of the network shown includes a network element NE-A, a ring-type transport 15 comprising network elements 15-1, 15-2 and 15-3, and a set 16 of dual-homed network elements 16-1 and 16-2. The ring-type transport 15 may be, e.g., a SONET/SDH or optical ring configured in a well-known conventional manner. In accordance with the invention, the ring-type transport 15 is coupled between the network element NE-A and the set 16 of dual-homed network elements 16-1 and 16-2. A given demand is routed from NE-A via element 15-1 of the ring-type transport 15 to element 15-2. At element 15-2, a copy of the corresponding signal is dropped, and the signal continues on to element 15-3. In the opposite direction, a signal select operation is used to select either the original signal from element 15-3 or the copy from element 15-2. The copy dropping and signal selection operations are well-known operations in the field of communication networks, implementable in a straightforward manner, and are therefore not described in detail herein.

Figure 1:
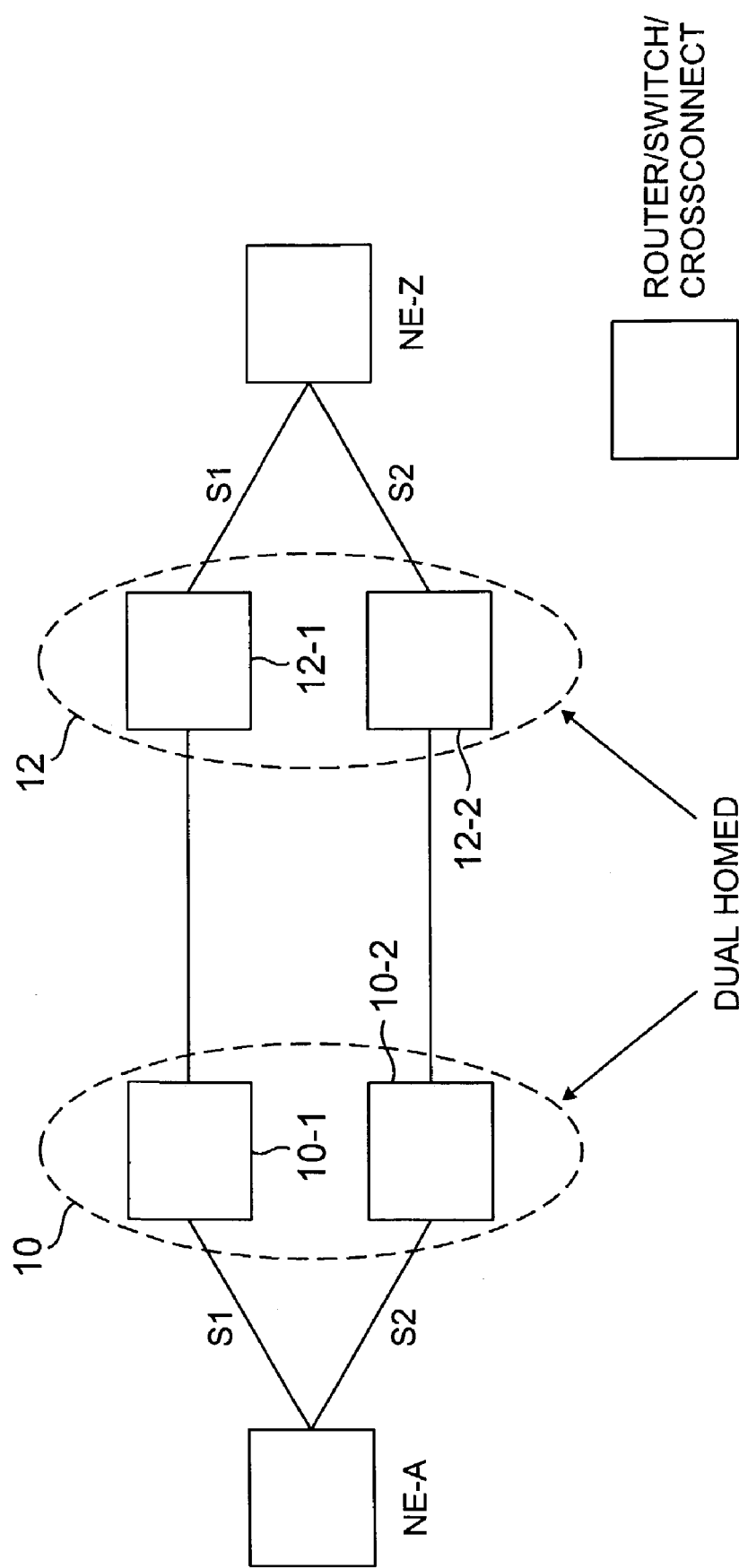
FIG. 1 illustrates a conventional dual-homing approach to providing protection against nodal failures in a network.

Advantageously, the arrangement of FIG. 2 provides protection against nodal failures without the need for doubling the given demand as in the conventional dual-homed approach of FIG. 1. Moreover, the approach results in spare ring capacity which can provide additional protection against network failures, or can be used for other purposes. For example, the invention can provide link level protection against fiber cuts or other failures. The invention also provides a reduction in complexity relative to conventional dual-homed architectures.

The ring-type transport 15 may utilize known transport mechanisms, such as, e.g., dual ring interworking (DRI) or dual node interworking (DNI) mechanisms used in conjunction with conventional add-drop multiplexers (ADMs) or other similar devices.

Figure 3:
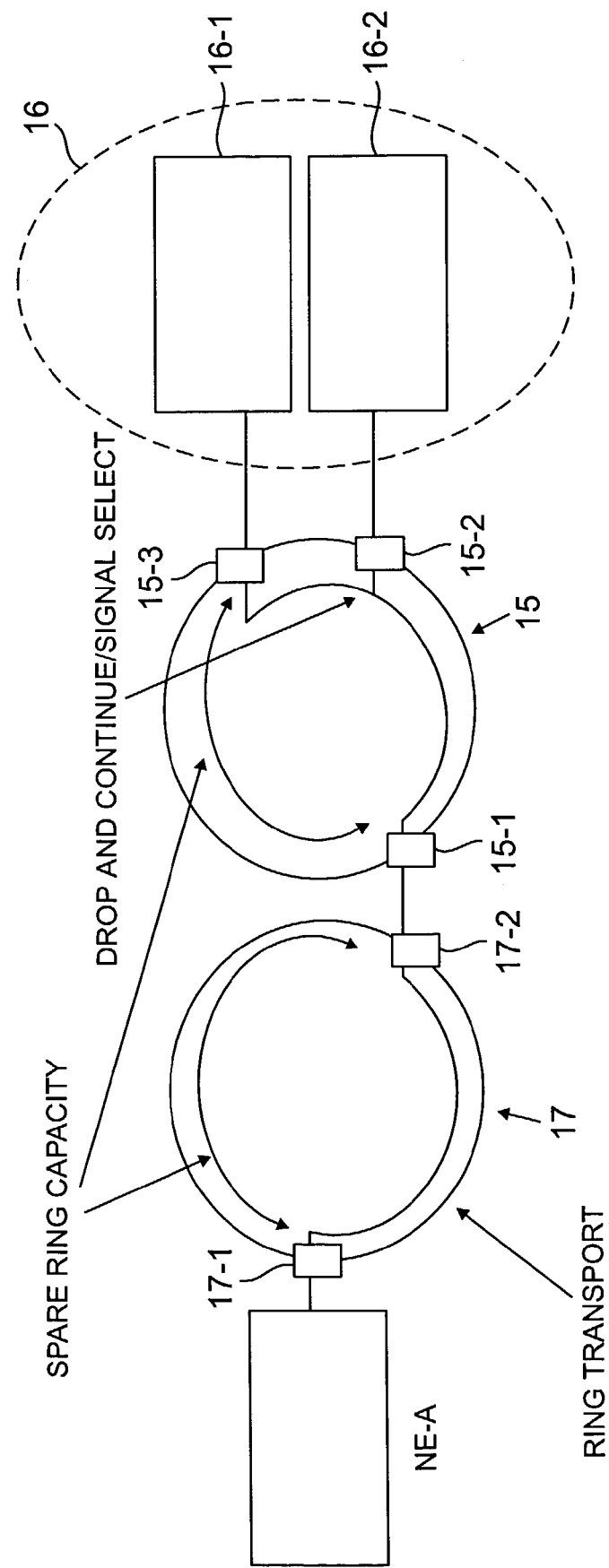
FIG. 3 shows a multi-ring implementation of the dual-homing approach of the present invention.

FIG. 3 shows a multi-ring implementation of the dual-homing approach of the present invention. In this implementation, a second ring-type transport 17 with network elements 17-1 and 17-2 is coupled between the network element NE-A and the ring-type transport 15. The given demand is routed from NE-A via elements 17-1 and 17-2 of the ring-type transport 15, and then routed in the manner previously described in conjunction with FIG. 2. It will be appreciated that this improved dual-homing approach of the present invention can be implemented with many different numbers and arrangements of ring-type transports.

Figure 4:
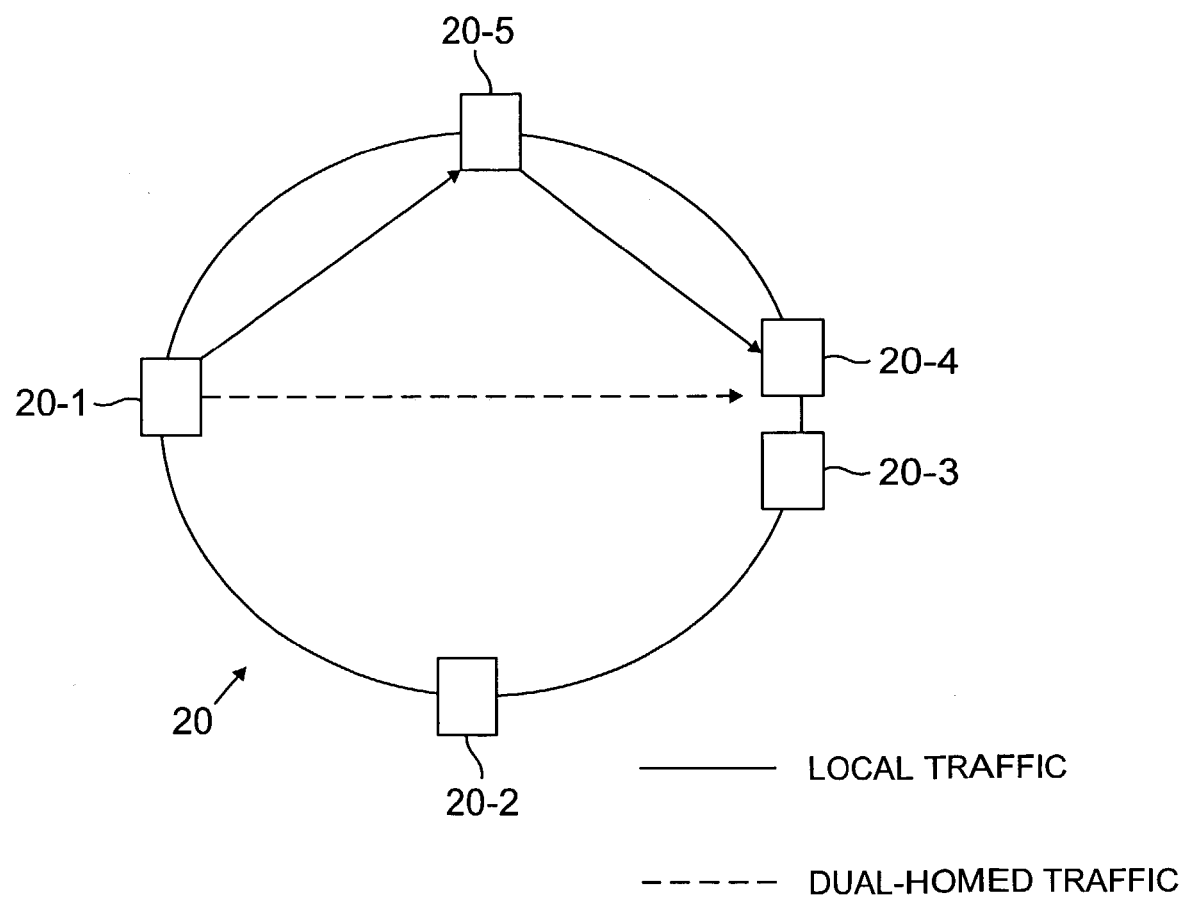
FIG. 4 shows an example of a set of traffic demands over a ring-type transport.
Figure 5:
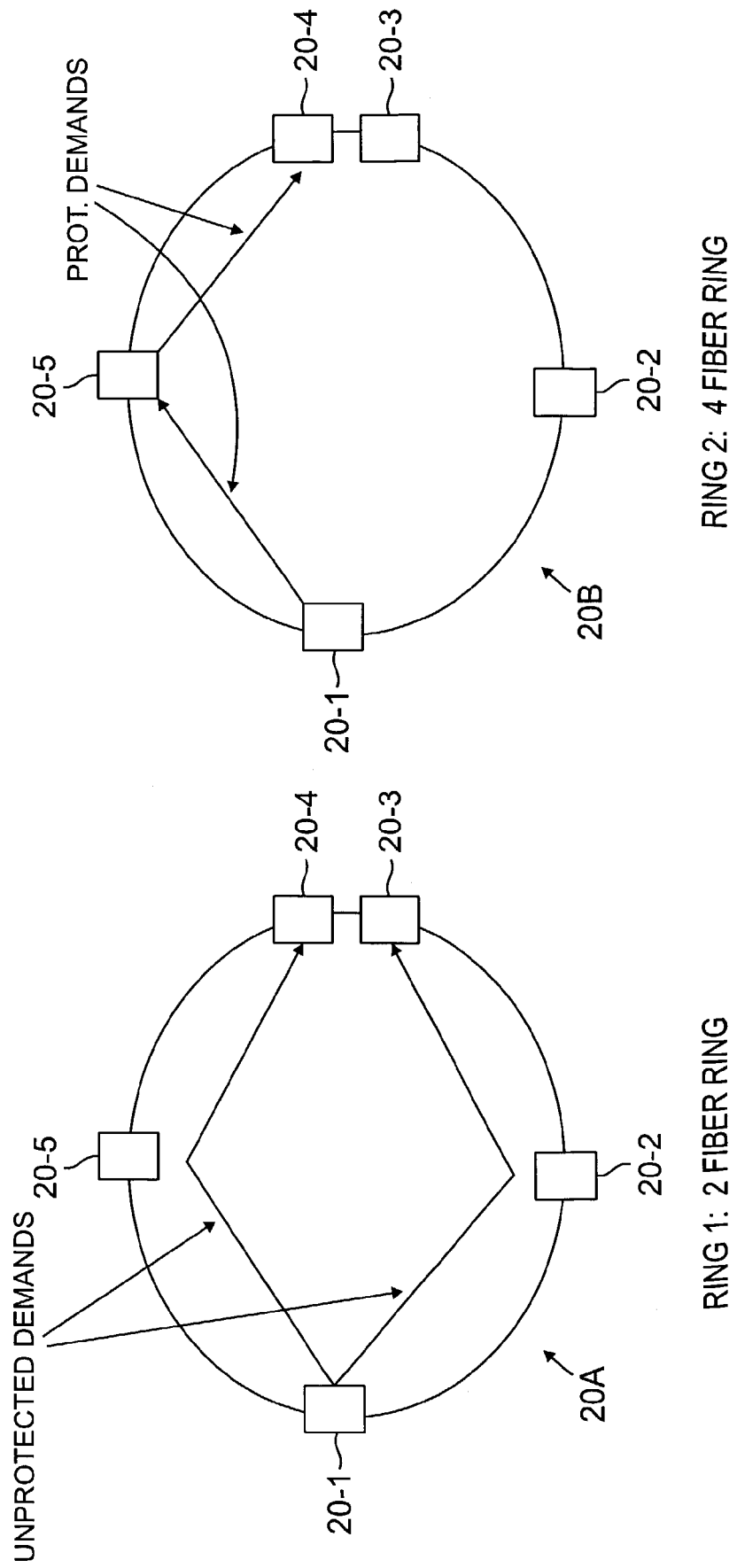
FIG. 5 shows the manner in which the set of traffic demands of FIG. 4 are routed in accordance with the conventional dual-homing approach of FIG. 1.

FIG. 4 shows an example of a set of traffic demands over a portion of a network comprising a single ring 20 of network elements 20-1, 20-2, 20-3, 20-4 and 20-5. The set of traffic demands include both local traffic and dual-homed traffic. FIG. 5 shows the manner in which the set of traffic demands of FIG. 4 are routed in accordance with the conventional dual-homing approach of FIG. 1. This conventional approach basically requires two distinct rings 20A and 20B arranged as shown in FIG. 5. The ring 20A is a 2 fiber ring used to route unprotected demands corresponding to the dual-homed traffic, while the ring 20B is a 4 fiber ring used to route protected demands corresponding to the local traffic. A total of 6 fibers are therefore needed in this example to route the set of traffic demands of FIG. 4 using the conventional dual-homed approach.

Figure 6:
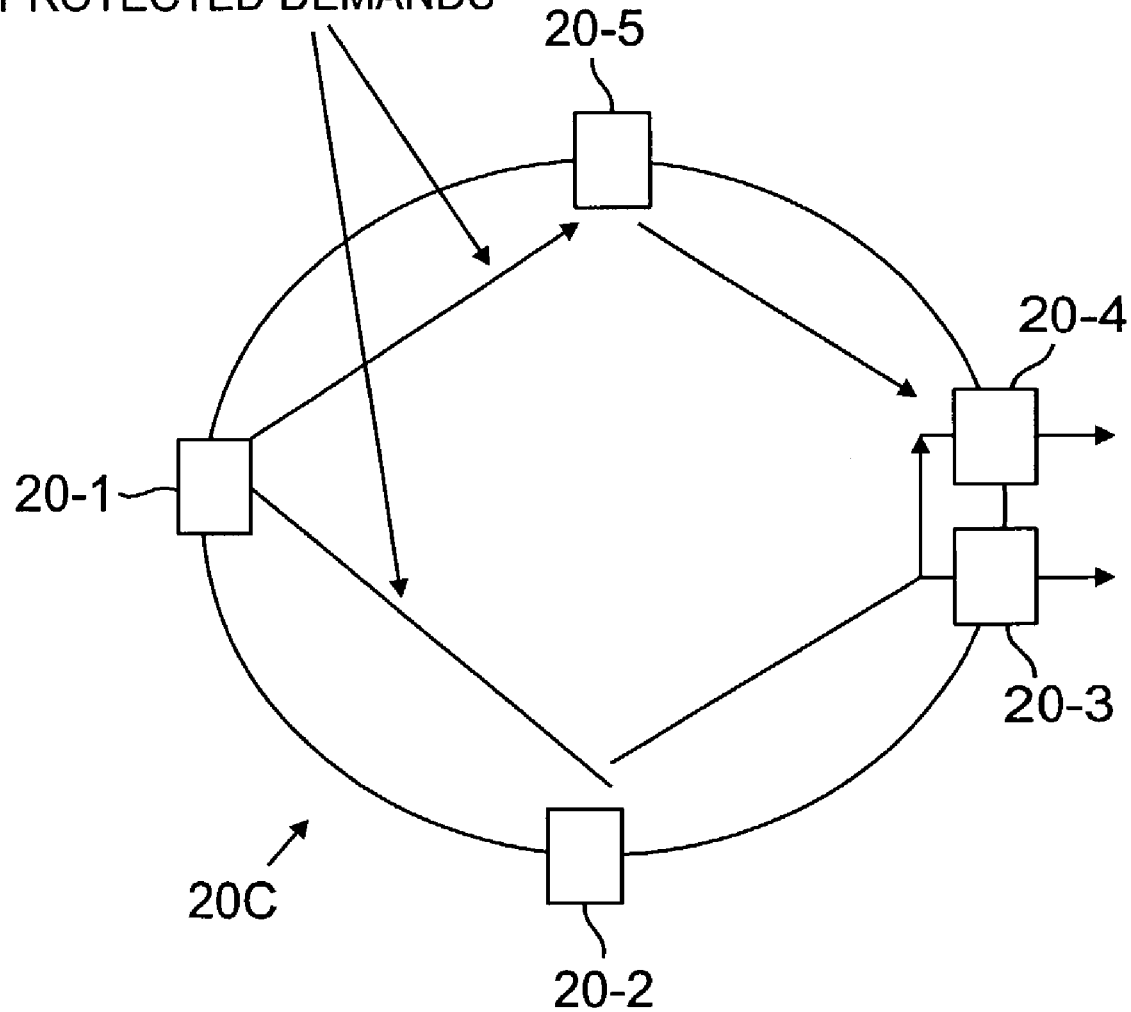
FIG. 6 shows the manner in which the set of traffic demands of FIG. 4 are routed in accordance with the improved dual-homing approach of FIG. 2.

FIG. 6 shows the manner in which the set of traffic demands of FIG. 4 are routed in accordance with the improved dual-homing approach of FIG. 2. In this approach, the set of demands are routed using a single ring 20C as shown. This single ring in this example includes 4 fibers, a network capacity savings of 33% relative to the 6 fibers required using the conventional approach. Even greater savings may be achieved relative to conventional arrangements in which the two segments S1 and S2 of a given demand in the conventional dual-homing arrangement of FIG. 1 are further protected against link failures by the provision of additional capacity.

Figure 7:
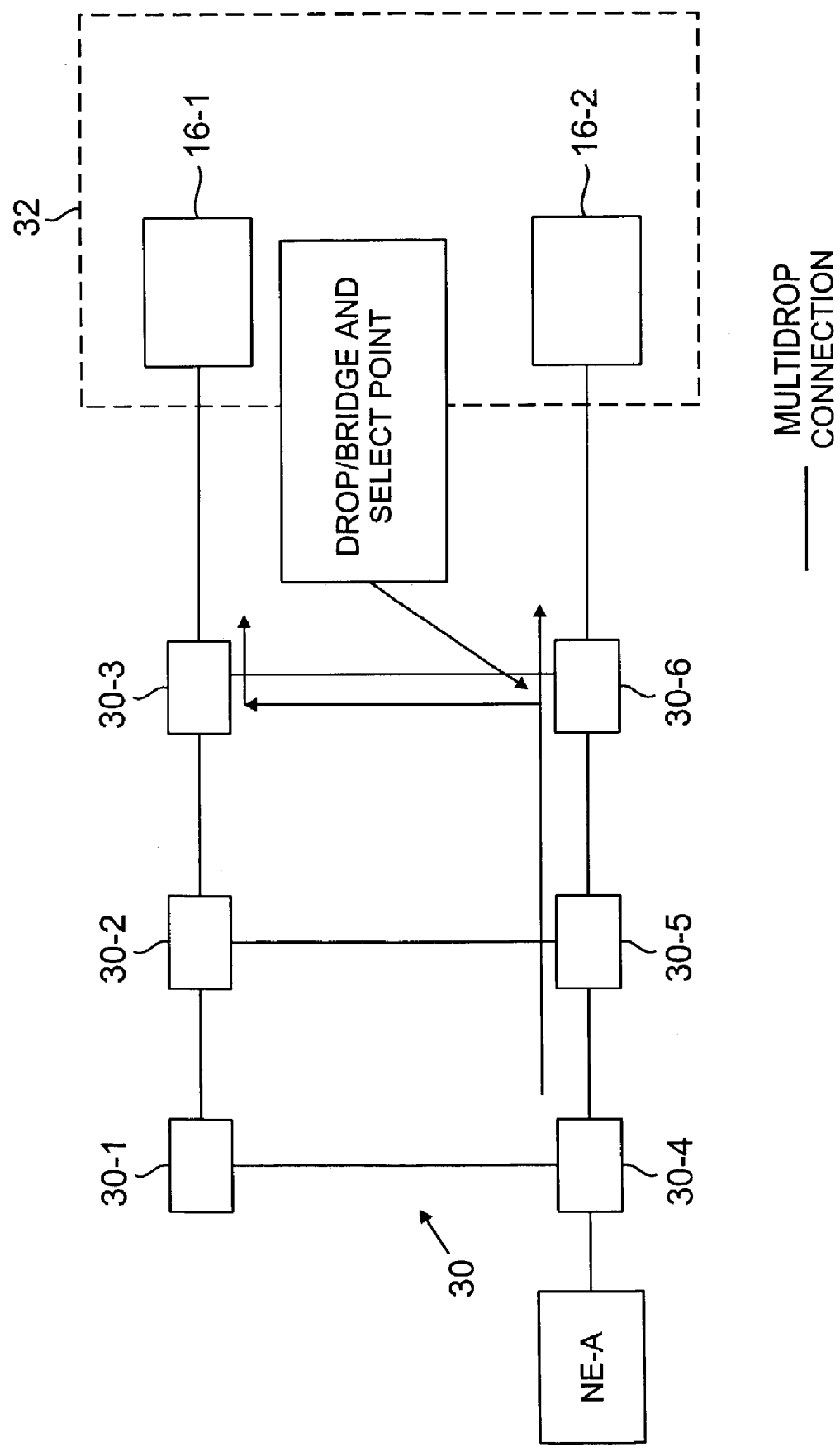
FIG. 7 illustrates an improved dual-homing approach which utilizes a mesh-type transport and a multidrop mechanism in accordance with the invention.

FIG. 7 illustrates another improved dual-homing approach in accordance with the invention. This approach utilizes a mesh-type transport and a multidrop mechanism. The figure shows a portion of a network comprising a mesh-type transport 30 having network elements 30-1, 30-2, 30-3, 30-4, 30-5 and 30-6 interconnected as shown. A set 32 of dual-homed elements includes the elements 16-1 and 16-2. In accordance with the invention, a multidrop connection is implemented in the mesh-type transport 30. More particularly, the multidrop connection shown includes a drop/bridge and select point associated with the network element 30-6. A copy of a signal associated with a given demand is dropped at the network element 30-6, and the signal continues on to the network element 30-3. Bridging and signal selection capabilities are also implemented in the network element 30-6.

It should be appreciated that the particular multidrop connection shown in FIG. 7 is by way of illustrative example only, and could of course be implemented in other ways. As one possibility, network element 30-3 or one or more other network elements could serve as drop/bridge and select points in an alternative implementation.

Figure 8:
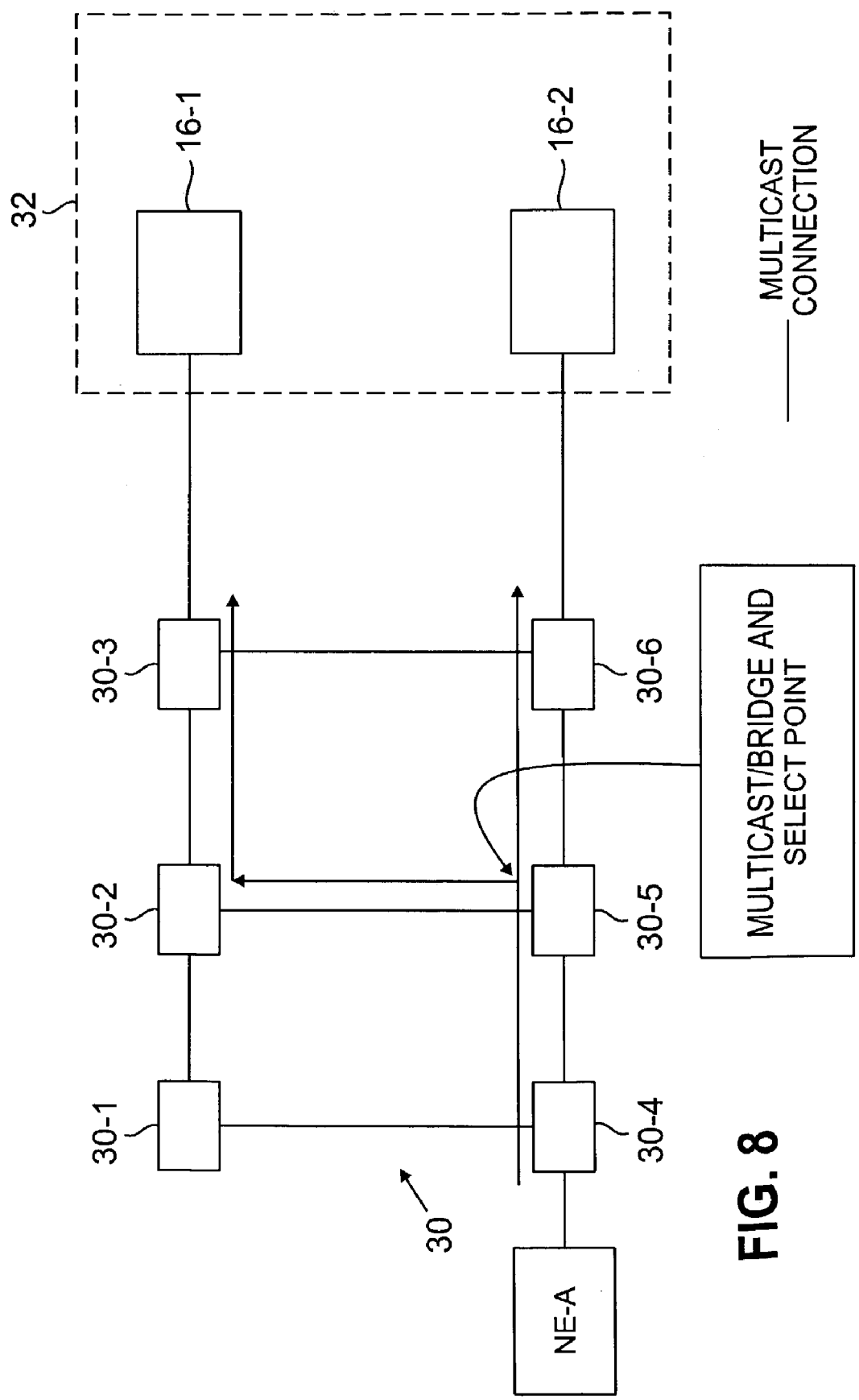
FIG. 8 illustrates an improved dual-homing approach which utilizes a mesh-type transport and a multicast mechanism in accordance with the invention.

FIG. 8 illustrates another improved dual-homing approach in accordance with the invention. This approach utilizes a mesh-type transport and a multicast mechanism. The mesh type transport in this embodiment is again the mesh-type transport 30 having network elements 30-1, 30-2, 30-3, 30-4, 30-5 and 30-6 interconnected as shown, with the set 32 of dual-homed elements including the elements 16-1 and 16-2. In accordance with the invention, a multicast connection is implemented using one or more of the network elements. More particularly, the multicast connection shown includes a multicast/bridge and select point associated with the network element 30-5. A signal associated with a given demand is multicast from the network element 30-6, to network elements 30-2 and 30-6 as shown. From element 30-2, the signal continues on to the network element 30-3. Bridging and signal selection capabilities are also implemented in the network element 30-5.

As in the case of the illustrative multidrop embodiment of FIG. 7, it should again be appreciated that the particular multicast connection shown in FIG. 8 is by way of example only, and could be implemented in other ways. For example, network elements other than network element 30-5 could serve as a multicast/bridge and select point in alternative implementations.

Figure 9:
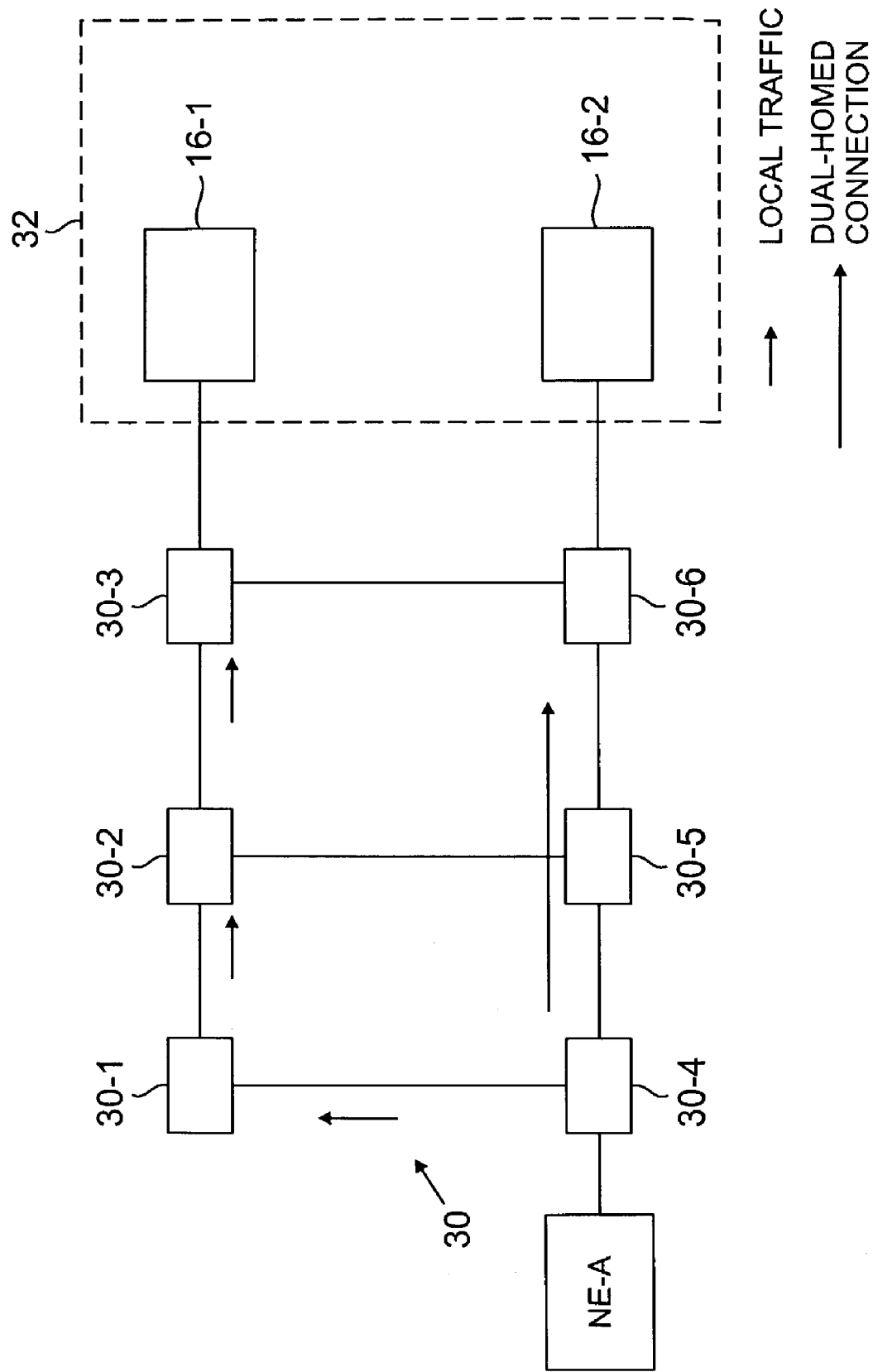
FIG. 9 shows an example of a set of traffic demands over a mesh-type transport.
Figure 10:
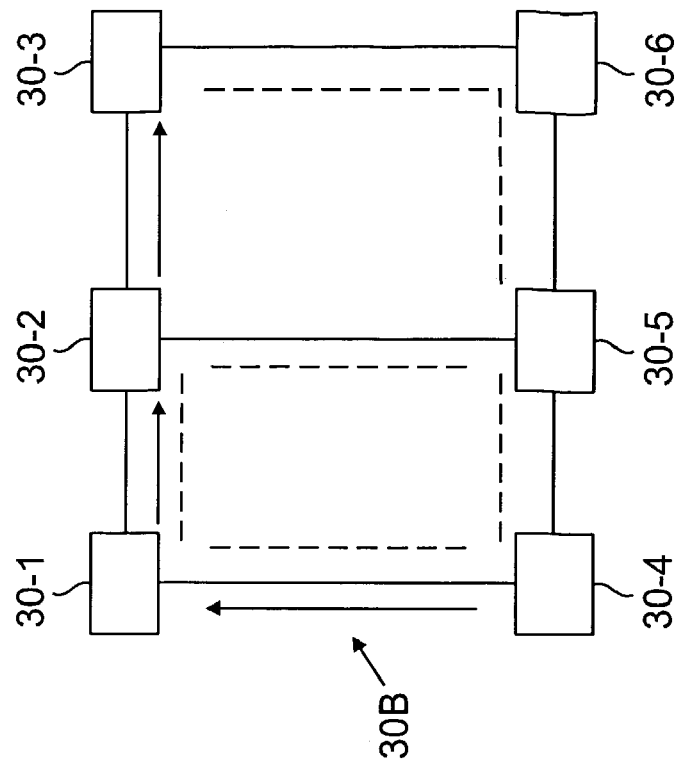
FIG. 10 shows the manner in which the set of traffic demands of FIG. 9 are routed in accordance with the conventional dual-homing approach of FIG. 1.
Figure 10:
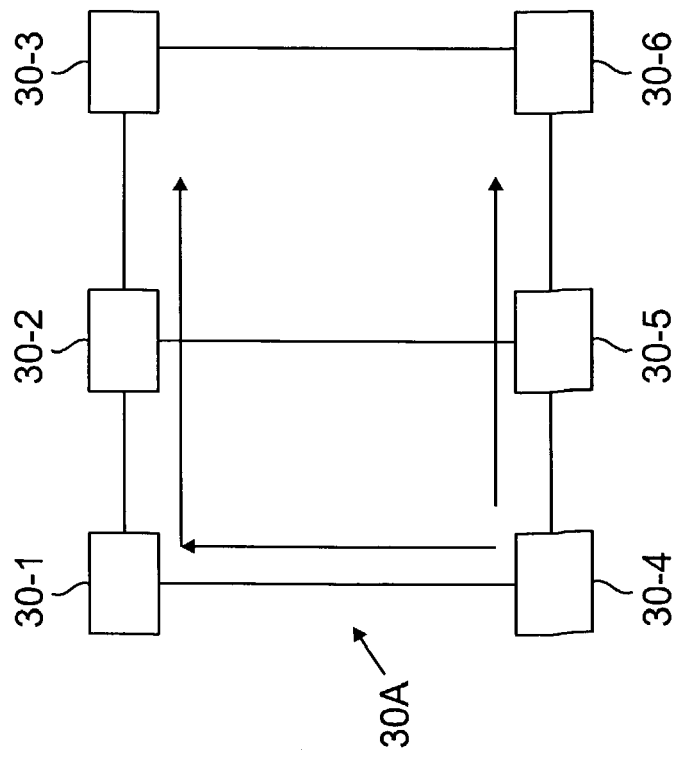

FIG. 9 shows an example of a set of traffic demands over the mesh-type transport 30 which was described in conjunction with FIGS. 7 and 8 above. The set of traffic demands in this example includes both local traffic, denoted by short arrows, and dual-homed traffic, denoted by longer arrows. FIG. 10 shows the manner in which the set of traffic demands of FIG. 9 are routed in accordance with the conventional dual-homing approach of FIG. 1. This conventional approach utilizes the routing shown over the mesh-type transport 30A for transport of the dual-homed traffic, which requires a capacity of 5 units, or one unit for each element-to-element portion of a given connection. It also utilizes the routing shown over the mesh-type transport 30B for transport of the local traffic, which requires a capacity of 9 units, for a total capacity of 14 units in this example. The dashed lines in 30B denote protection capacity, which are included in the 9 unit local traffic capacity requirement.

Figure 11:
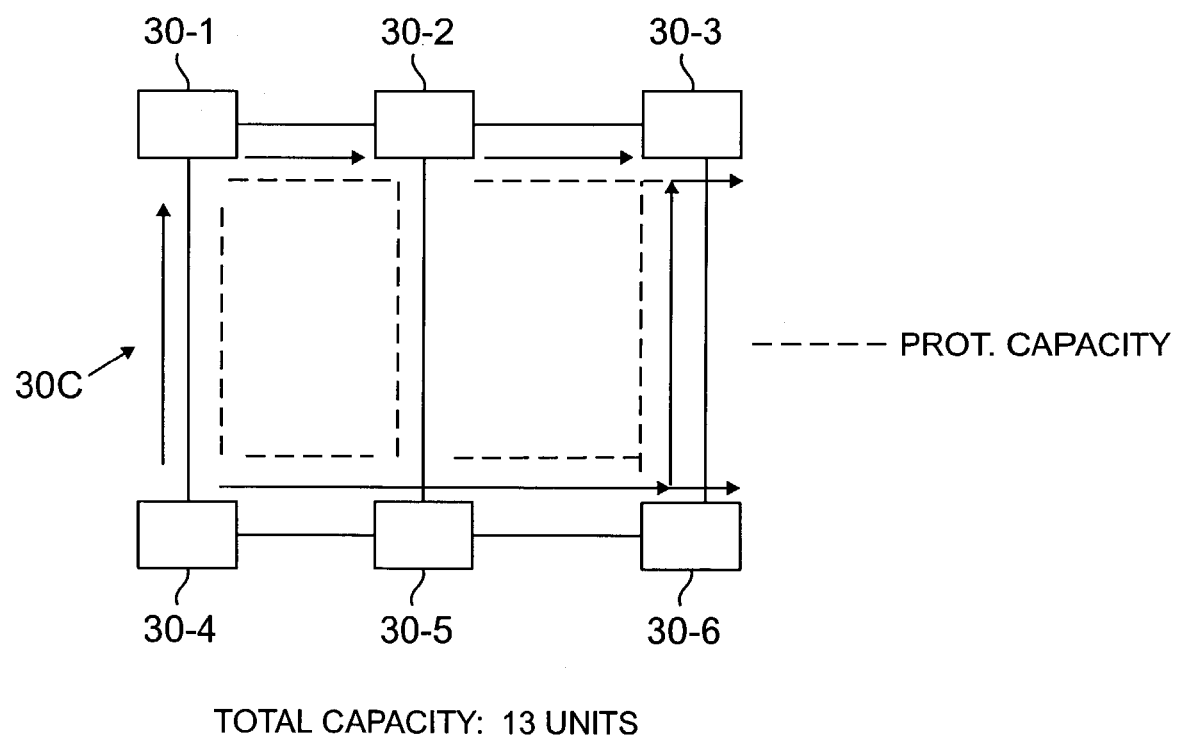
FIG. 11 shows the manner in which the set of traffic demands of FIG. 9 are routed in accordance with the multidrop mechanism of FIG. 7.

FIG. 11 shows the manner in which the set of traffic demands of FIG. 9 are routed in accordance with the multidrop mechanism of the present invention as illustrated in conjunction with FIG. 7. In this approach, both the local traffic and the dual-homed traffic are routed over the mesh-type transport 30C as shown. A total capacity of 13 units is required in this example, a savings of about 7% over the conventional routing illustrated in FIG. 10. The dashed lines in 30C again denote protection capacity, which is included in the total capacity.

The multidrop mechanism of the present invention thus provides a significant capacity savings relative to the conventional dual-homing approach, using an efficient transport layer solution.

Figure 12:
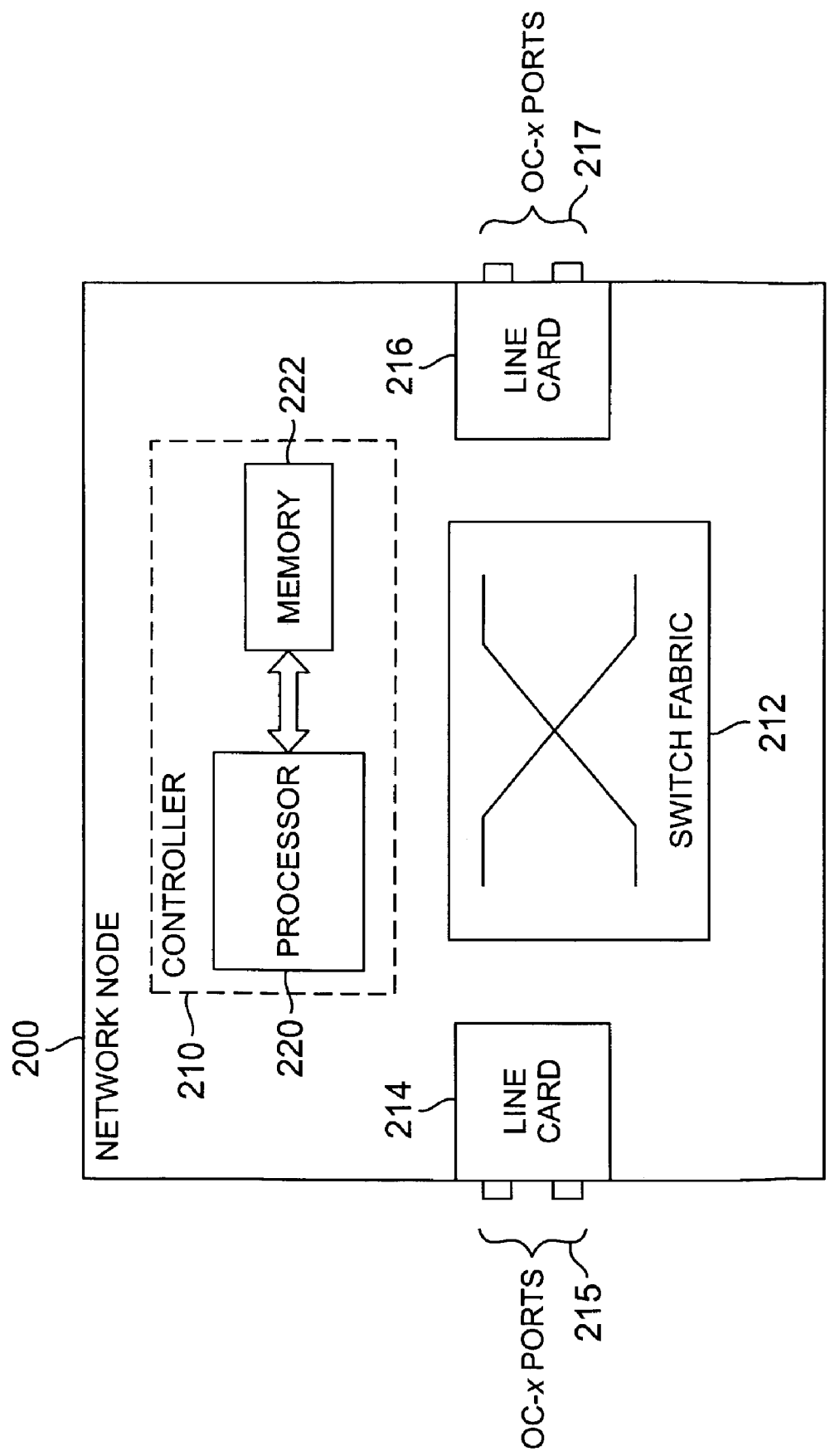
FIG. 12 shows a block diagram of a network element in accordance with the invention.

FIG. 12 shows an exemplary network element 200 which may be used to implement the above-described routing functions. The network element 200 may therefore correspond, e.g., to one or more of the network elements referred to in conjunction with FIGS. 2 through 11. It should be noted that the term "network element" as used herein is intended to include any type of network node, and a network element may therefore also be referred to herein as a network node.

The network element 200 includes a controller 210, a switch fabric 212, a first line card 214 having a set of OC-x ports 215 associated therewith, and a second line card 216 having a set of OC-x ports 217 associated therewith. It should be understood that the network element 200 has been simplified for purposes of illustration. For example, the network element 200 in practice may include a substantially larger number of line cards and ports, as required for a given application. Moreover, the ports 215 and 217 may be configured to support any desired type of traffic demand, the OC-x type being just an illustrative example.

The controller 210 includes a processor 220 and a memory 222. The processor 220 may be, e.g., a microprocessor, a microcontroller, an application-specific integrated circuit (ASIC) or other type of processing devices, as well as portions or combinations of such devices. The memory 222 may include an electronic random access memory (RAM), a read-only memory (ROM) or other type or memory device, as well as portions or combinations of such devices. The memory 222 may be used to store a demand database for storing demands for network capacity, and a set of routing tables which specify routing paths through a corresponding network for particular demands.

It should be noted that the network element 200 may be an element of an optical network or other type of network which includes a very large number of nodes, and possibly a central controller. One or more of the network elements and the central controller may each represent a computer, processor-based switch or other type of processor-based device configured to provide the network protection techniques described herein. The invention is well-suited for use in large-scale regional, national and international networks which may include many subnetworks, each having hundreds of nodes, but can be used in any network application.

The above-described embodiments of the invention are intended to be illustrative only. For example, the invention can be applied to networks utilizing any desired type of traffic or network transport medium. In addition, the invention can be implemented in a wide variety of different types and arrangements of network elements. These and numerous other alternative embodiments may be devised by those skilled in the art without departing from the scope of the following claims.

What is claimed is:

1. A method of routing traffic between elements of a network so as to provide protection against network failures, the method comprising the steps of:
   routing a given traffic demand from a first network element to a second network element; and
   processing the traffic demand in the second network element such that a copy of a signal associated with the demand is at least one of: (i) retained at the second network element, while the signal is routed to at least one additional network element; and (ii) routed to at least one additional network element, while the signal is routed to at least one network element other than the additional network element;
   wherein the second network element is coupled to a first dual-homed network element of a set of dual-homed network elements, either directly or via a given network element corresponding to said at least one network element other than the additional network element; and
   wherein the given network element corresponding to said at least one additional network element is coupled to a second dual-homed network element of the set of dual-homed network elements, either directly or via another additional network element.

2. The method of claim 1 wherein the first network element comprises a source network element of the traffic demand.

3. The method of claim 1 wherein the second network element comprises an element of a ring-type transport.

4. The method of claim 1 wherein the second network element comprises an element of a mesh-type transport.

5. The method of claim 1 wherein the copy of the signal associated with the demand is generated and retained at the second network element and the signal continues on to another network element.

6. The method of claim 1 wherein a copy of the signal is generated at each of a set of multiple network elements including the second network element.

7. The method of claim 1 wherein the copy of the signal associated with the demand comprises at least a portion of a multicast of the signal generated by the second network element and multicast to at least two other network elements.

8. The method of claim 1 wherein the second network element is an element of a set of dual-homed network elements.

9. The method of claim 1 wherein the at least one additional network element is an element of a set of dual-homed network elements.

10. An apparatus for routing traffic between elements of a network so as to provide protection against network failures, the apparatus comprising:
    a given network element coupled to one or more additional network elements and operative to process a traffic demand received from one of the additional network elements such that a copy of a signal associated with the demand is at least one of: (i) retained at the given network element, while the signal is routed to at least one of the additional network elements; and (ii) routed to at least one of the additional network elements, while the signal is routed to at least one network element other than the one of the additional network elements;
    wherein the given network element is coupled to a first dual-homed network element of a set of dual-homed network elements, either directly or via another network element corresponding to said at least one network element other than the one of the additional network elements; and
    wherein another network element corresponding to said at least one of the additional network elements is coupled to a second dual-homed network element of the set of dual-homed network elements, either directly or via another additional network element.

11. The apparatus of claim 10 wherein the traffic demand is received at the given network element from a source network element of the traffic demand.

12. The apparatus of claim 10 wherein the given network element comprises an element of a ring-type transport.

13. The apparatus of claim 10 wherein the given network element comprises an element of a mesh-type transport.

14. The apparatus of claim 10 wherein the copy of the signal associated with the demand is generated and retained at the given network element and the signal continues on to another network element.

15. The apparatus of claim 10 wherein the copy of the signal is generated at each of a set of multiple network elements including the given network element.

16. The apparatus of claim 10 wherein the copy of the signal associated with the demand comprises at least a portion of a multicast of the signal generated by the given network element and multicast to at least two other network elements.

17. The apparatus of claim 10 wherein the given network element is an element of a set of dual-homed network elements.

18. The apparatus of claim 10 wherein at least one of the additional network elements is an element of a set of dual-homed network elements.

19. An apparatus for routing traffic between elements of a network so as to provide protection against network failures, the apparatus comprising:
    a first network element; and
    a second network element coupled to the first network element, the first network element routing a given traffic demand to the second network element, the second network element processing the traffic demand such that a copy of a signal associated with the demand is at least one of: (i) retained at the second network element, while the signal is routed to at least one additional network element; and (ii) routed to at least one additional network element, while the signal is routed to at least one network element other than the additional network element;
    wherein the second network element is coupled to a first dual-homed network element of a set of dual-homed network elements, either directly or via a given network element corresponding to said at least one network element other than the additional network element; and
    wherein the given network element corresponding to said at least one additional network element is coupled to a second dual-homed network element of the set of dual-homed network elements, either directly or via another additional network element.

* * * * *